United States Patent
Akiyama et al.

(10) Patent No.: US 10,956,757 B2
(45) Date of Patent: Mar. 23, 2021

(54) IMAGE PROCESSING DEVICE, OUTSIDE RECOGNITION DEVICE

(71) Applicant: Clarion Co., Ltd., Saitama (JP)

(72) Inventors: Yasuhiro Akiyama, Tokyo (JP); Yasusi Kanada, Tokyo (JP); Koichi Hamada, Tokyo (JP)

(73) Assignee: Clarion Co., Ltd., Saitama (JP)

(*) Notice: Subject to any disclaimer, the term of this patent is extended or adjusted under 35 U.S.C. 154(b) by 53 days.

(21) Appl. No.: 16/322,149

(22) PCT Filed: Jul. 31, 2017

(86) PCT No.: PCT/JP2017/027726
§ 371 (c)(1),
(2) Date: Jan. 31, 2019

(87) PCT Pub. No.: WO2018/025811
PCT Pub. Date: Feb. 8, 2018

(65) Prior Publication Data
US 2019/0156131 A1 May 23, 2019

(30) Foreign Application Priority Data
Aug. 1, 2016 (JP) .............................. JP2016-151351

(51) Int. Cl.
*G06K 9/00* (2006.01)
*G08G 1/16* (2006.01)
(Continued)

(52) U.S. Cl.
CPC ..... *G06K 9/00805* (2013.01); *G06K 9/00791* (2013.01); *G06K 9/4642* (2013.01);
(Continued)

(58) Field of Classification Search
CPC .......... G06K 9/00791; G06K 9/00798; G06K 9/00805; G06K 9/3233; G06K 9/4642; G06T 7/00; G08G 1/16; H04N 7/18
See application file for complete search history.

(56) References Cited

U.S. PATENT DOCUMENTS 6,091,833 A * 7/2000 Yasui .................. G05D 1/0246
382/104
6,466,684 B1 * 10/2002 Sasaki ................ G06K 9/00798
340/435
(Continued)

FOREIGN PATENT DOCUMENTS

EP 3 054 400 A1 8/2016
JP 1-265400 A 10/1989
(Continued)

OTHER PUBLICATIONS

International Search Report (PCT/ISA/210) issued in PCT Application No. PCT/JP2017/027726 dated Oct. 24, 2017 with English translation (three (3) pages).
(Continued)

*Primary Examiner* — Ian L Lemieux
(74) *Attorney, Agent, or Firm* — Crowell & Moring LLP

(57) ABSTRACT

An image processing device includes: a road surface detecting section to detect a road surface region from an input image based on a shot image obtained by shooting with a camera; a time-series verifying section to perform time-series verification to verify a result of detection of the road surface region in the input image in a time-series manner; a detection region selecting section to set a detection region for detection of an object in the input image according to the result of detection of the road surface region by the road surface detecting section and a result of the time-series
(Continued)

verification by the time-series verifying section; and a detecting section to detect the object in the detection region.

11 Claims, 11 Drawing Sheets

(51) Int. Cl.
    *G06T 7/00*     (2017.01)
    *H04N 7/18*     (2006.01)
    *G06K 9/46*     (2006.01)

(52) U.S. Cl.
    CPC .................. *G06T 7/00* (2013.01); *G08G 1/16* (2013.01); *H04N 7/18* (2013.01)

(56) References Cited

U.S. PATENT DOCUMENTS

| | | | | |
|---|---|---|---|---|
| 8,054,201 B2* | 11/2011 | Okugi | .................... | G08G 1/167 340/901 |
| 2010/0215218 A1* | 8/2010 | Takahashi | ................. | G06T 3/00 382/104 |
| 2010/0266161 A1* | 10/2010 | Kmiecik | .................... | G06T 5/30 382/103 |
| 2013/0182896 A1* | 7/2013 | Azuma | .............. | G06K 9/00805 382/103 |
| 2014/0086477 A1 | 3/2014 | You et al. | | |
| 2015/0169967 A1* | 6/2015 | Nakamura | ............... | G06K 9/03 382/104 |
| 2015/0227800 A1* | 8/2015 | Takemae | ............ | G06K 9/00798 382/104 |
| 2015/0228194 A1* | 8/2015 | Nomura | .................... | G08G 1/16 348/118 |
| 2016/0114727 A1* | 4/2016 | Watanabe | ................ | H04N 7/18 348/118 |
| 2016/0232413 A1* | 8/2016 | Ito | ...................... | G06K 9/00791 |
| 2017/0017839 A1* | 1/2017 | Hiramatsu | ......... | G06K 9/00664 |
| 2019/0272435 A1* | 9/2019 | Kundu | ............. | G06K 9/00798 |
| 2020/0031281 A1* | 1/2020 | Watanabe | ............... | H04N 7/18 |

FOREIGN PATENT DOCUMENTS

| | | |
|---|---|---|
| JP | 2003-317106 A | 11/2003 |
| JP | 2014-67407 | 4/2014 |
| JP | 2014-146135 A | 8/2014 |

OTHER PUBLICATIONS

Japanese-language Written Opinion (PCT/ISA/237) issued in PCT Application No. PCT/JP2017/027726 dated Oct. 24, 2017 (four (4) pages).
Extended European Search Report issued in European Application No. 17836916.1 dated Mar. 25, 2020 (seven (7) pages).
Japanese-language Office Action issued in counterpart Japanese Application No. 2016-151351 dated Aug. 27, 2019 with unverified English translation (six (6) pages).
Chinese-language Office Action issued in Application No. 201780044270.4 dated Feb. 7, 2021 with English translation (ten (10) pages).

\* cited by examiner

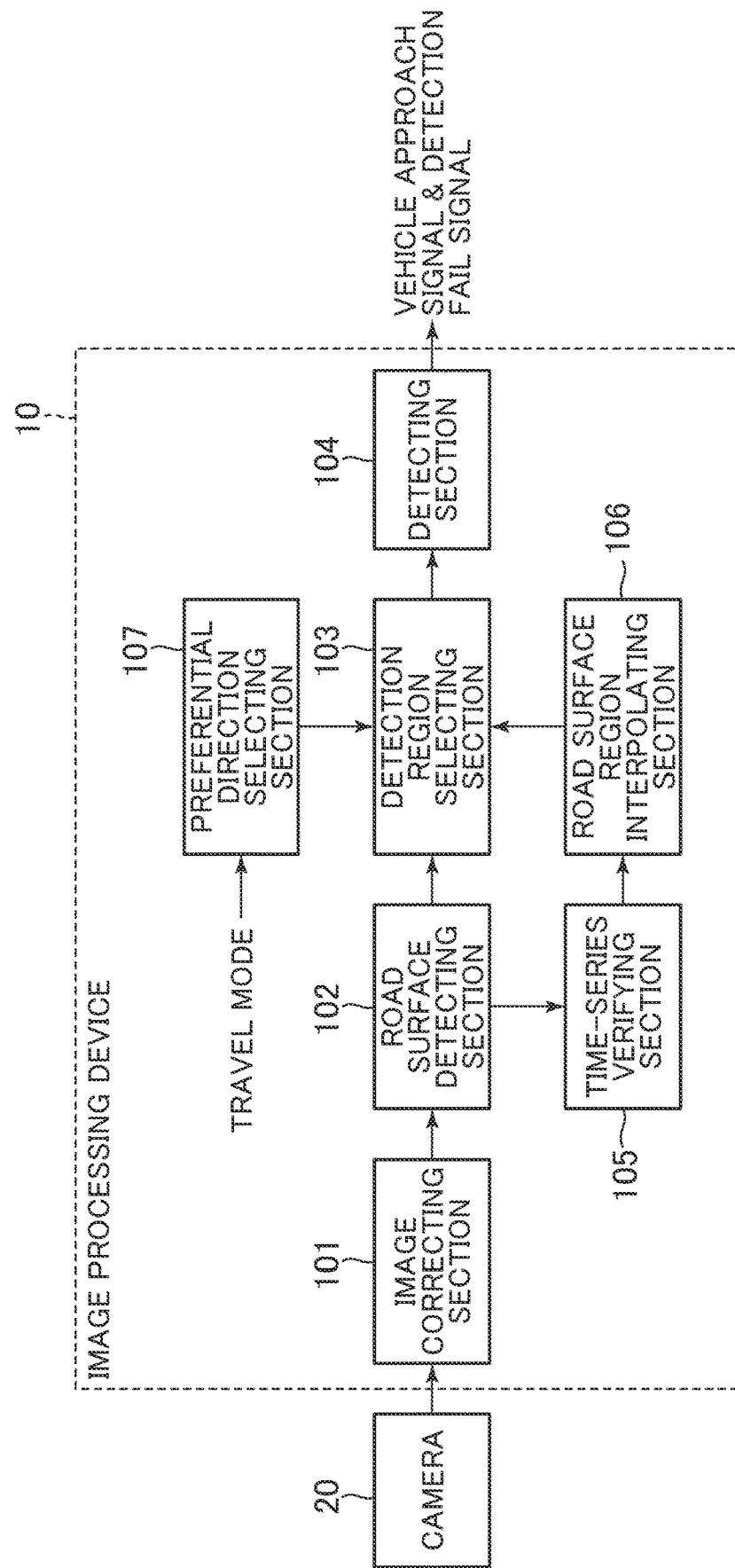

NON-ROAD SURFACE

NON-ROAD SURFACE

NON-ROAD SURFACE

NON-ROAD SURFACE

ROAD SURFACE

INPUT IMAGE
(FISH-EYE IMAGE)

RESULT OF ROAD
SURFACE DETECTION

FIG. 5

| TRAVEL MODE | GENERAL ROAD | EXPRESSWAY |
|---|---|---|
| FORWARD TRAVEL | BACKWARD DIRECTION | BACKWARD DIRECTION |
| BACKWARD TRAVEL | BACKWARD DIRECTION | ALL DIRECTIONS |
| PARKING ASSITANCE (PARALLEL PARK START-UP) | FORWARD AND BACKWARD DIRECTIONS | ALL DIRECTIONS |

IMAGE PROCESSING DEVICE, OUTSIDE RECOGNITION DEVICE

TECHNICAL FIELD

The present invention relates to an image processing device and an outside recognition device.

BACKGROUND ART

In the recent years, in order to prevent accidents such as collision of vehicles and collision of a human being and a vehicle, techniques which monitor the conditions around the own vehicle through an in-vehicle camera and upon detection of a hazard, give a warning to the driver and also automatically control the behavior of the own vehicle have been progressing. For hazard prevention and safety of the own vehicle and automated driving control as mentioned above, it is necessary to take a vehicle present around the own vehicle as the object of observation and continue monitoring its approach all the time. In these techniques, not only a vehicle as the object of observation but also various things such as surrounding structures show up in the background in the image taken by the in-vehicle camera. For this reason, it has been difficult to identify and detect the object of observation accurately, which may cause erroneous detection.

As a technique for solving erroneous detection due to the background in the image as mentioned above, a technique has been proposed to recognize, in the image, a road surface region on which a vehicle can travel and perform vehicle detection in the road surface region. In this relation, for example, Patent Literature 1 discloses a method in which a gradation diagram is made from a parallax image taken by a stereo camera and using the gradation diagram, a road surface in the image is identified to decide whether or not a vehicle can travel in the region.

CITATION LIST

Patent Literature

Patent Literature 1: Japanese Unexamined Patent Application Publication No. 2014-67407

SUMMARY OF INVENTION

Technical Problem

In the technique described in Patent Literature 1, generally a gradation diagram is narrow in the dynamic range of representable information and also easily affected by the brightness of the surroundings. Therefore, in the technique in Patent Literature 1, in some cases it is difficult to identify a road surface in the image accurately, and in that case, it is difficult to detect an object present around the own vehicle, such as another vehicle, from a shot image accurately.

Solution to Problem

The image processing device according to the present invention includes: a road surface detecting section to detect a road surface region from an input image based on a shot image obtained by shooting with a camera; a time-series verifying section to perform time-series verification to verify a result of detection of the road surface region in the input image in a time-series manner; a detection region selecting section to set a detection region for detection of an object in the input image according to the result of detection of the road surface region by the road surface detecting section and a result of the time-series verification by the time-series verifying section; and a detecting section to detect the object in the detection region.

The outside recognition device according to the present invention includes an image processing device and sends at least one of a warning signal to warn a driver of the own vehicle and a vehicle control signal to control movement of the own vehicle according to a result of detection of the other vehicle by the detecting section.

Advantageous Effects of Invention

According to the present invention, an object present around the own vehicle, such as another vehicle, can be detected from a shot image accurately.

BRIEF DESCRIPTION OF DRAWINGS

FIG. 1 is a block diagram which shows the functional configuration of the image processing device according to the first embodiment of the present invention.

FIG. 5 is a view which shows an example of a setting table used to set a preferential direction.

DESCRIPTION OF EMBODIMENTS

First Embodiment

Figure 2A:
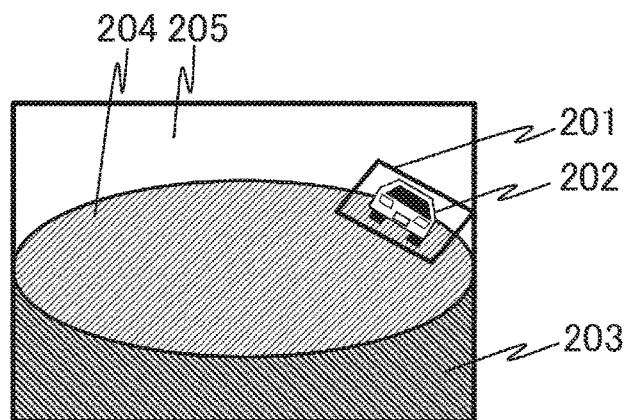
FIGS. 2A and 2B are views which show the process of shot image distortion correction.

Next, the image processing device according to the first embodiment will be described referring to drawings. FIG. 1 is a block diagram which shows the functional configuration of the image processing device 10 according to the first embodiment of the present invention. The image processing device 10 shown in FIG. 1 is mounted in a vehicle. In the explanation given below, the vehicle in which the image processing device 10 is mounted is called "the own vehicle" and another vehicle present around the own vehicle is called "another vehicle".

The image processing device 10 is connected to a camera 20 installed at a given position of the own vehicle which corresponds to a photographing area, for example, on the body of the own vehicle. The image processing device 10 includes an image correcting section 101, a road surface detecting section 102, a detection region selecting section 103, a detecting section 104, a time-series verifying section 105, a road surface region interpolating section 106, and a preferential direction selecting section 107. The various functions of the image processing device 10 shown in FIG. 1 can be implemented by combining hardware such as a microcomputer and memory and various programs to be executed on a microcomputer, as appropriate.

The camera 20 takes a photo of another vehicle present around the own vehicle as an animation or a still image at every given time interval and outputs each frame of the acquired animation or each still image to the image correcting section 101, as a shot image at every given time interval. The camera 20 can be installed at the desired position of the own vehicle in order to facilitate recognition of another vehicle in the image processing device 10. For example, the camera 20 is installed on the front bumper, rear bumper, left or right side view mirror or the like of the own vehicle. Also, the camera 20 may be installed inside the own vehicle. Furthermore, the camera 20 may be independently installed for the purpose of recognizing another vehicle present only in a specific area around the own vehicle or a plurality of cameras 20 may be installed so as to recognize another vehicle in all the areas around the own vehicle.

In this embodiment, a fish-eye camera is used for the camera 20. A fish-eye camera is a camera which uses a fish-eye lens with a focusing property on a far wider angle side than a lens used in a normal camera. The fish-eye can have an advantage that the shooting range is wide. From the viewpoint of image processing in vehicle detection, it is desirable that a wide range can be shot by a single camera at a time. On the other hand, a shot image obtained by the camera 20 is a so-called fish-eye image, so distortion is larger and the resolution is lower in regions nearer to the upper, lower, left and right ends of the shot image which correspond to remoter positions from the own vehicle. For this reason, the problem exists that a distorted shot image received from the camera 20 is not suitable for vehicle detection.

Therefore, in order to solve the above problem, the shot image obtained by the camera 20 is sent to the image correcting section 101 in the image processing device 10. The image correcting section 101 performs a distortion correction process on the shot image (fish-eye image) received from the camera 20 to convert the shot image into a distortion-free image suitable for vehicle detection. In the distortion correction process by the image correcting section 101, for example, a nonlinear local geometric correction method in which a shot image is converted into an actual spatial map image using the known distortion characteristic of the fish-eye lens or a linear local geometric correction method in which a shot image is corrected by a distortion factor representing the distortion characteristic of the fish-eye lens in a simplified manner may be used. An algorithm other than the above may be used for the distortion correction process.

FIG. 2 are views which show the process of shot image distortion correction by the image correcting section 101. FIG. 2(a) is an example of a fish-eye image obtained by shooting with the camera 20 installed on the right side view mirror of the own vehicle. In this fish-eye image, the left portion corresponds to the forward direction or the front direction of the own vehicle and the right portion corresponds to the backward direction or the rear direction of the own vehicle. In FIG. 2(a), a road surface 204 shows up in the center of the image, a background 205, such as the sky, shows up in the upper portion of the image, and a body 203 of the own vehicle shows up in the lower portion of the image. Furthermore, another vehicle 202 approaching from behind the own vehicle shows up.

Figure 2B:
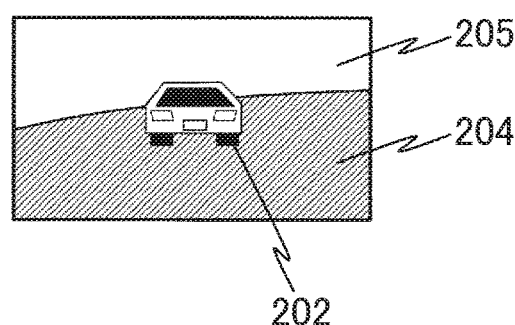
Figure 3C:
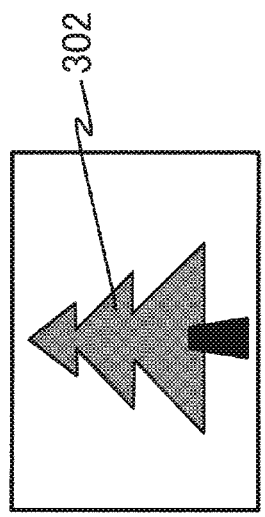
FIGS. 3A to 3E are views which show examples of images for learning which are used to produce a detector.
Figure 3E:
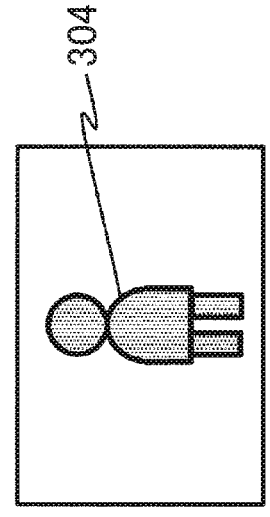
Figure 3B:
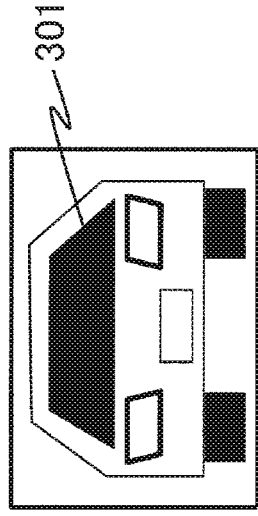
Figure 3D:
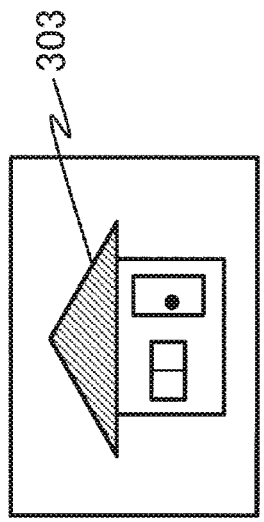
Figure 3A:
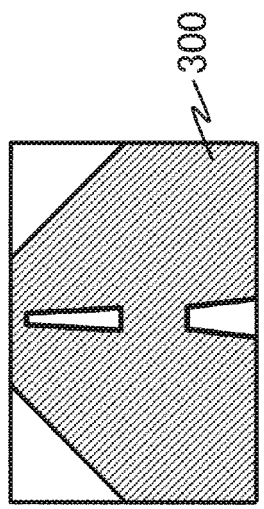

The image correcting section 101 sets, for example, a region including the other vehicle 202 in the fish-eye image as shown in FIG. 2(a) as a correction object region 201 and performs a distortion correction process on the image part in the correction object region 201. FIG. 2(b) is an example of a corrected image obtained by performing the distortion correction process on the correction objection region 201 in FIG. 2(a). In this corrected image, correction has been made so that the other vehicle 202, road surface 204, and background 205 look equivalent to the actual spatial map images respectively.

For the example of FIG. 2, an explanation has been made of the case that an area around the other vehicle 202 is set as the correction object region 201 and the distortion correction process is performed on the area. However, the image correcting section 101 can perform a distortion correction process on the desired region in the shot image as the correction object region. In addition, two or more correction object regions may be set in the shot image so that a distortion correction process is performed on each of them. Moreover, if a less distorted portion of a shot image is used for vehicle detection or a normal camera is used for the camera 20 instead of a fish-eye camera, the image correcting section 101 may be made so as not to perform a distortion correction process.

When the road surface detecting section 102 receives the image taken by the camera 20 and subjected to the distortion correction process by the image correcting section 101, it detects a road surface region corresponding to the road surface, from the received (input) image. The road surface detecting section 102, for example, divides the input image into a plurality of observation blocks and performs 2-class detection to identify whether each observation block corresponds to a road surface region or a non-road surface region other than a road surface region, using a detector to which a machine learning method is applied. Hereinafter, an observation block corresponding to a road surface region and an observation block corresponding to a non-road surface region are called a road surface block and a non-road surface block, respectively.

FIG. 3 are views which show examples of images for learning which are used to produce a detector for the road surface detecting section 102. FIG. 3(a) is an example of a learning image of a road surface region and FIG. 3(a) to FIG. 3(e) are examples of learning images of a non-road surface region. While a road surface 300 shows up in the learning image in FIG. 3(a), objects other than the road surface show up in the learning images in FIG. 3(b) to FIG. 3(e). Specifically, a vehicle 301, a tree 302, a building 303, and a human being 304 show up in the learning image in FIG. 3(b), the learning image in FIG. 3(c), the learning image in FIG. 3(d), and the learning image in FIG. 3(e), respectively. Learning images of non-road surface regions are not limited to the above examples and any other object is allowed to show up as far as it is not a road surface.

For a learning image of a non-road surface region, it is desirable to use an image in which an object appearing frequently in an actual vehicle travelling scene shows up. Also, similarly, for a learning image of a road surface region, it is desirable to use an image in which a road surface appearing frequently shows up. However, if it is difficult to collect such learning images, it is acceptable to use an image which contains an object appearing less frequently.

Meanwhile, machine learning which is used in the road surface detecting section 102 is a processing method in which generally a plurality of images of an object as the object of detection are entered and an image feature expressing the object is extracted from them and for an unknown input image, an identifying device parameter is automatically set so as to detect the learned image feature and identify. As a concrete example of this processing method, for example, Deep Learning is known. In deep learning, an image feature parameter common to a plurality of input images is subdivided to enable automatic extraction. As an example of the feature parameter extraction method, a feature extraction method which employs a neural network architecture is known. In the neural network architecture, a lot of input/output functions (activation functions) called neuron units, which react only at the time of agreeing with the image feature common to a group of input images, are combined for each small image region and these are stacked in layers, making up a pyramid structure. According to this method, while varying the position and image size of an object as the object of detection, an identifying device parameter is extracted for each layer of neuron units so that the object can be identified in a stepwise fashion, and finally an identifying device parameter which can identify the entire object can be obtained.

Figure 4A:
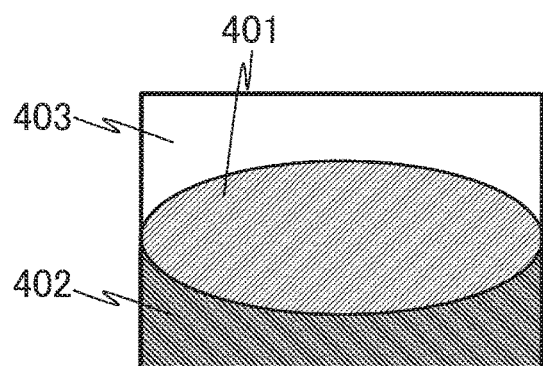
FIGS. 4A and 4B are views which show examples of results of road surface detection.
Figure 4B:
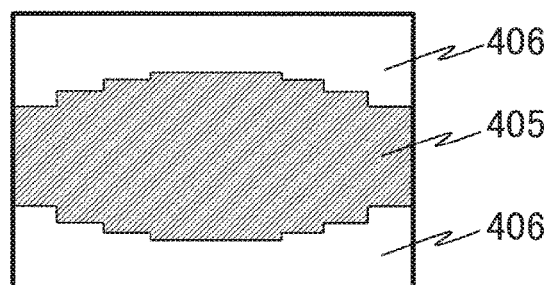

FIG. 4 are views which show examples of road surface detection by the road surface detecting section 102. FIG. 4(a) shows an example of a fish-eye image obtained by shooting with the camera 20. In this fish-eye image, as in FIG. 2(a), a road surface 401 shows up in the center of the image, a background 403, such as the sky, shows up in the upper portion of the image, and a body 402 of the own vehicle shows up in the lower portion of the image. FIG. 4(b) shows an example of the result of road surface detection obtained for the image in FIG. 4(a). FIG. 4(b) indicates that the image in FIG. 4(a) is divided into a plurality of observation blocks and among them, the observation block corresponding to the road surface 401 in FIG. 4(a) is recognized as a road surface block 405 and on the other hand the observation blocks corresponding to the body 402 and background 403 in FIG. 4(a) are recognized as non-road surface blocks 406. Here, for easy understanding, the result of road surface detection by the road surface detecting section 102 has been explained using a shot image before the distortion correction process. Actually, however, road surface detection by the road surface detecting section 102 is performed on an input image subjected to the distortion correction process by the image correcting section 101.

The time-series verifying section 105 performs time-series verification to verify the result of detection of a road surface region by the road surface detecting section 102 according to time-series change in the arrangement of the above road surface blocks and non-road surface blocks in the input image. In this time-series verification, whether part of the road surface region is hidden by another vehicle as the object of detection or whether the road shape corresponding to the road surface region has changed is verified using a plurality of temporally continuous input images generated from a plurality of shot images taken by the camera 20 at every given time interval. A concrete example of time-series verification which is performed by the time-series verifying section 105 will be described later.

The road surface region interpolating section 106 interpolates the road surface region detected from the input image by the road surface detecting section 102 as necessary according to the result of time-series verification by the time-series verifying section 105. For example, if the time-series verifying section 105 decides that part of the road surface region is hidden by another vehicle as the object of detection, the road surface region interpolating section 106 interpolates that part into the road surface region by changing that part from the non-road surface region to the road surface region. Consequently, if the part which actually belongs to the road surface region is mistakenly decided as a non-road surface region because it is hidden by another vehicle, the part can be treated as belonging to the road surface region which it actually belongs to.

The preferential direction selecting section 107 sets a preferential direction as a direction in which another vehicle as the object of detection should be detected preferentially, according to the traveling condition of the own vehicle. In order to judge the traveling condition of the own vehicle, a signal indicating the travel mode of the own vehicle is sent to the preferential direction selecting section 107.

FIG. 5 is a view which shows an example of a setting table used by the preferential direction selecting section 107 to set a preferential direction. In the setting table in FIG. 5, the travel modes of the own vehicle include forward travel, backward travel, and parking assistance. In addition, the setting table in FIG. 5 shows different preferential directions for the general road and expressway. By acquiring a signal indicating the travel mode of the own vehicle from the vehicle control CPU mounted in the own vehicle, the preferential direction selecting section 107 decides which mode the travel mode of the own vehicle is and also can decide whether the own vehicle is traveling on a general road or expressway.

The preferential direction selecting section 107 sets a preferential direction suitable for the travel mode of the own vehicle and the type of road on which it travels, according to the setting table in FIG. 5. For example, if the travel mode of the own vehicle is forward travel, the preferential direction selecting section 107 sets the backward direction of the own vehicle as the preferential direction regardless of whether it travels on a general road or expressway. Specifically, when the own vehicle is travelling forward, regardless of the type of road on which it travels, the backward direction of the own vehicle is set as the preferential direction so that another vehicle approaching from behind the own vehicle can be preferentially detected.

On the other hand, when the travel mode of the own vehicle is backward travel, the preferential direction selecting section 107 sets the backward direction of the own vehicle as the preferential direction if the road on which it travels is a general road, and sets all directions around the own vehicle as the preferential directions if the road on which it travels is an expressway. In other words, when the own vehicle is traveling backward on a general road, the backward direction of the own vehicle is set as the preferential direction so that another vehicle approaching from behind the own vehicle can be preferentially detected as in forward travel. Also, although usually the own vehicle is not expected to travel backward on an expressway (except in a parking area), if such a situation should happen, the degree of hazard is high enough and thus all directions around the own vehicle are set as the preferential directions so that another vehicle can be detected using the entire shot image.

Furthermore, when the travel mode of the own vehicle is parking assistance, the preferential direction selecting section 107 sets the forward and backward directions of the own vehicle as the preferential directions if the road on which it travels is a general road, and sets all directions around the own vehicle as the preferential directions if the road on which it travels is an expressway. In other words, when the own vehicle starts from the parallel parking state on a general road using parking assistance, the forward and backward directions of the own vehicle are set as the preferential directions so that another vehicle approaching from ahead of or behind the own vehicle can be preferentially detected. Also, although usually the own vehicle is not expected to park on an expressway (except in a parking area), if such a situation should happen, the degree of hazard is high enough and thus all directions around the own vehicle are set as the preferential directions so that another vehicle can be detected using the entire shot image.

The detection region selecting section 103 sets a vehicle detection region in the input image to detect another vehicle as the object of detection according to the result of road surface region detection by the road surface detecting section 102 and the result of time-series verification by the time-series verifying section 105. At this time, if the road surface region interpolating section 106 has interpolated the road surface region according to the result of time-series verification by the time-series verifying section 105, the detection region selecting section 103 sets a vehicle detection region including the interpolated road surface region according to the result of interpolation. Also, if it has been decided from the result of time-series verification by the time-series verifying section 105 that the road shape has changed, a vehicle detection region is set in consideration of the change in the road shape. Furthermore, when a direction is set as a preferential direction for the own vehicle by the preferential direction selecting section 107, a vehicle detection region is set in consideration of the preferential direction. In other words, the detection region selecting section 103 determines a road surface region in the input image by combining output of the road surface detecting section 102 and output of the road surface region interpolating section 106 and further sets a vehicle detection region on the determined road surface region according to output of the time-series verifying section 105 and specification by the preferential direction selecting section 107.

Figure 6A:
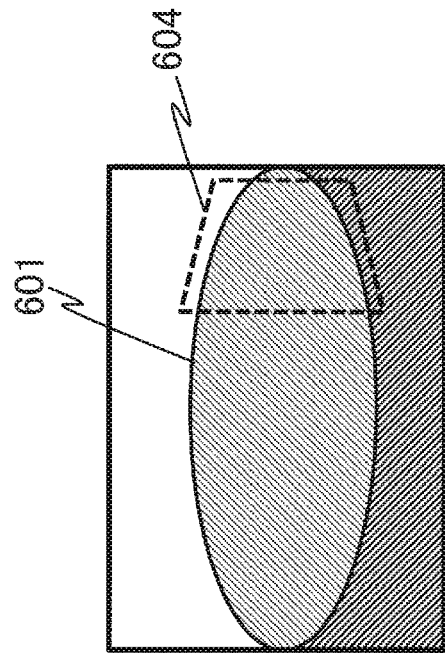
FIGS. 6A to 6C are views which show examples of a vehicle detection region.
Figure 6B:
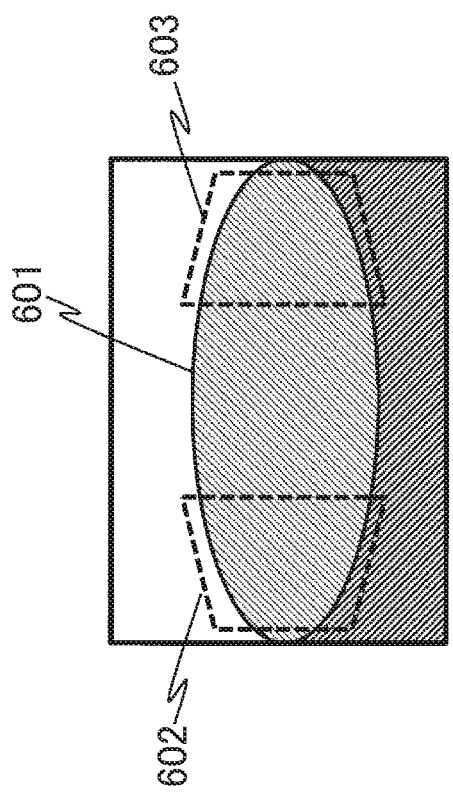
Figure 6C:
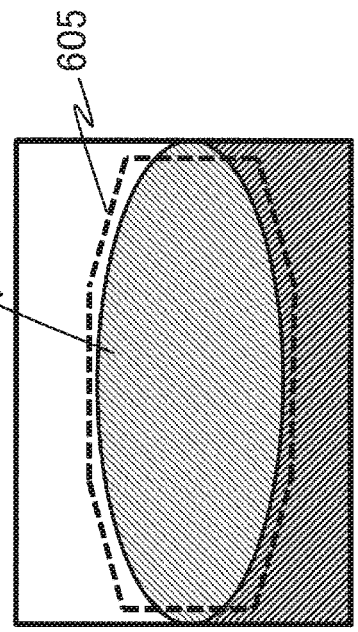

FIG. 6 are views which show examples of a vehicle detection region set by the detection region selecting section 103. FIG. 6(a) is an example of a vehicle detection region in the case that the forward and backward directions of the own vehicle are set as the preferential directions. In FIG. 6(a), vehicle detection regions 602 and 603 set on a road surface region 601 in a fish-eye image obtained by shooting with the camera 20 correspond to the forward and backward directions of the own vehicle, respectively. FIG. 6(b) is an example of a vehicle detection region in the case that the backward direction of the own vehicle is set as the preferential direction. In FIG. 6(b), a vehicle detection region 604 set on the road surface region 601 in the fish-eye image corresponds to the backward direction of the own vehicle. FIG. 6(c) is an example of a vehicle detection region in the case that all directions around the own vehicle are set as the preferential directions. In FIG. 6(c), a vehicle detection region 605 set on the entire road surface region 601 in the fish-eye image corresponds to all directions around the own vehicle. In addition to this, for example, if the forward direction of the own vehicle is set as the preferential direction, a vehicle detection region like the vehicle detection region 602 in FIG. 6(a) may be set on the road surface region in a way opposite to the example in FIG. 6(b). Here, for easy understanding, a vehicle detection region set for each preferential direction has been explained using a shot image before the distortion correction process. Actually, however, a vehicle detection region is set on the road surface region for an input image subjected to the distortion correction process by the image correcting section 101.

The detecting section 104 detects another vehicle present around the own vehicle from the input image according to the vehicle detection region set by the detection region selecting section 103. The detecting section 104 detects another vehicle showing up in the vehicle detection region by performing a given vehicle detection process on the part of the input image set as the vehicle detection region. Specifically, the detecting section 104 can detect another vehicle by deciding whether or not a part having a feature as a vehicle is present in the vehicle detection region, for example, using a machine learning type detector similar to the one described in connection with the road surface detecting section 102. If another vehicle in the vehicle detection region is detected, the detecting section 104 sends a vehicle approach signal indicating that another vehicle is approaching. Also, for example, if an effective vehicle detection region cannot be set in the input image, like a case that the road surface detecting section 102 does not detect a road surface region, it sends a detection FAIL signal.

Next, a concrete example of time-series verification by the time-series verifying section 105 will be described referring to FIGS. 7 to 10.

FIG. 7 are views which explain examples of the time-series verification procedure in the case that part of the road surface region is hidden by another vehicle. When part of the road surface is hidden by another vehicle showing up in the input image, that part is mistakenly recognized as a non-road surface region by road surface detection, which is inconvenient in setting a vehicle detection region. In order to solve this problem, the time-series verifying section 105 decides whether or not the road surface region is hidden by another vehicle, by time-series verification as mentioned below.

Figure 7A:
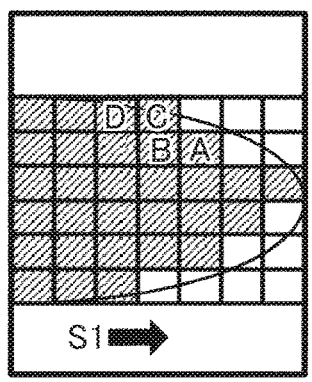
FIGS. 7A to 7D are views which explain examples of the time-series verification procedure in the case that part of the road surface region is hidden by another vehicle.
Figure 7B:
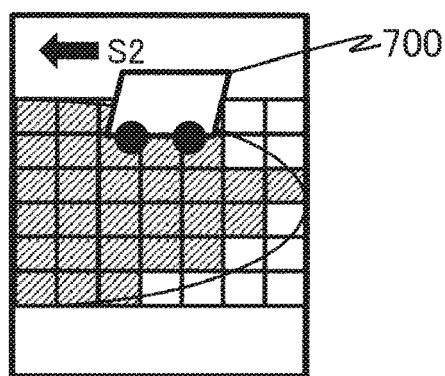
Figure 7C:
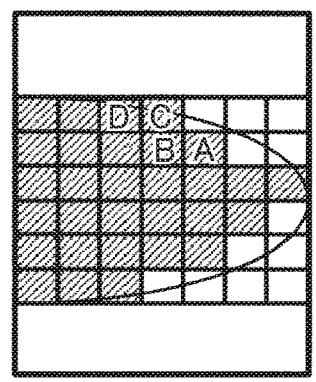

FIG. 7(a), FIG. 7(b), and FIG. 7(c) show examples of shot images taken by the camera 20 in a time-series manner, in which the shot images are obtained in this order. For the convenience of explanation, these figures show only the right half of each shot image as a fish-eye image. Here, for easy understanding, an explanation will be given using the result of road surface detection for a shot image before the distortion correction process. Actually, however, time-series verification by the time-series verifying section 105 is performed on the result of road surface detection for an input image subjected to the distortion correction process by the image correcting section 101.

As mentioned earlier, the road surface detecting section 102 divides an input image to set a plurality of observation blocks on the input image and identifies whether each observation block is a road surface block or a non-road surface block. In time-series verification by the time-series verifying section 105, whether or not the road surface region is hidden by another vehicle is decided according to time-series change in the arrangement of road surface blocks and non-road surface blocks in the input image. As shown in FIGS. 7(a) to (c), for the road surface detecting section 102 it is desirable to identify a frequently appearing part of the road surface region in the input image, namely an area sandwiched by the borderlines between the horizon line and the body of the own vehicle, according to the known camera installation geometric information representing the installation position and installation angle of the camera 20 in the own vehicle, the angle of view of the camera 20 and the like, and provide observation blocks in the area.

In the image in FIG. 7(a), since nothing shows up on the road surface, all the observation blocks corresponding to the road surface part in the image are correctly recognized as road surface blocks. After that, as shown in the image in FIG. 7(b), as another vehicle 700 approaching from behind the own vehicle shows up on the road surface, the road surface part where the other vehicle 700 shows up becomes hidden, so the observation blocks corresponding to that part are mistakenly recognized as non-road surface blocks. Then, as shown in the image in FIG. 7(c), as the other vehicle 700 has passed over, all the observation blocks are again recognized as road surface blocks.

Figure 7D:
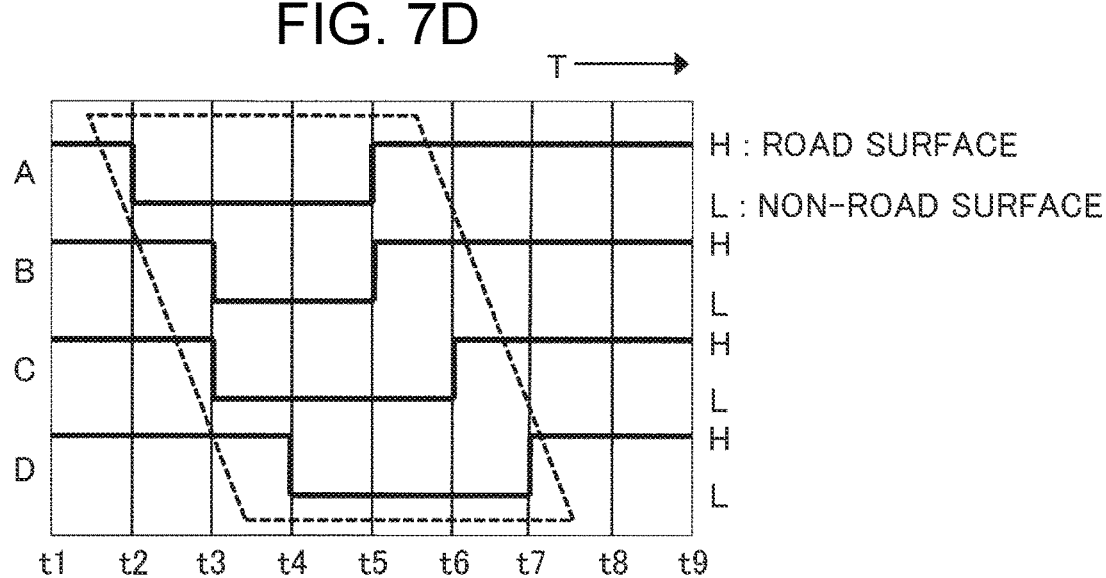

FIG. 7(d) is a chart which shows an example of change in the result of recognition of observation blocks in the case that the input image changes as shown from FIG. 7(a) through FIG. 7(b) to FIG. 7(c). Here, among a plurality of observation blocks set on the input image, attention is paid to four observation blocks A, B, C, and D shown in FIGS. 7(a) to 7(c). The chart shown in FIG. 7(d) indicates the results of recognition of the observation blocks A, B, C, and D in the order from top in the period from time t1 to t9, in which "H" represents a road surface block and "L" represents a non-road surface block.

Since the observation blocks A, B, C, and D are all set so as to correspond to the road surface part of the input image, basically they must be recognized as road surface blocks all the time. However, as shown in FIG. 7(b), if the other vehicle 700 approaching the own vehicle shows up in the input image, part of the road surface part becomes hidden. As a consequence, as shown in FIG. 7(d), at least one of the observation blocks A, B, C, and D, adjacent to each other, is recognized as a non-road surface block in the period from time t2 to t7 and the position of the non-road surface block shifts as time elapses. When the positions of non-road surface blocks adjacent to each other in the input image shift in a time-series manner, it may be considered that some moving body shows up in the input image and the road surface is hidden due to the moving body.

Furthermore, taking the moving speed of the background in the input image as S1 and the moving speed of the plural non-road surface blocks, namely the moving speed of the other vehicle 700 as S2, the decision about the above moving body can be made more reliably by comparing the moving speeds S1 and S2. In other words, if the difference between the moving speed S2 of the non-road surface blocks and the background moving speed S1 is not less than a specified value, it can be decided with certain evidence that what shows up on the road surface in the input image is a moving body and not a stationary body such as the shadow of a building. The background moving speed S1 can be calculated, for example, by tracking an object showing up above the horizon line in the input image through a tracking process, etc. Alternatively, by calculating the actual distance on a map image for each one observation block from the abovementioned camera installation geographic information, the background moving speed S1 and non-road surface block moving speed S2 may be calculated not as speeds on an image but as speeds in real space.

The time-series verifying section 105 performs time-series verification to decide whether or not part of the road surface region is hidden by another vehicle, according to the procedure explained above. Consequently, when the positions of the non-road surface blocks adjacent to each other in the input image shift in a time-series manner and the difference between the moving speed of the non-road surface blocks and the background moving speed is not less than a specified value, it can be decided that the road surface region is hidden by another vehicle as an object.

Figure 8A:
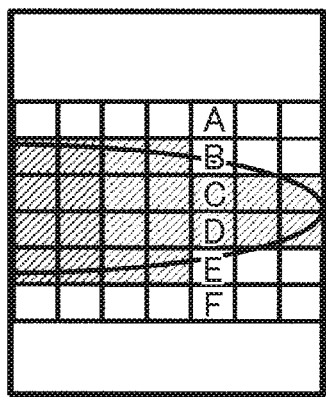
FIGS. 8A to 8C are views which show examples of shot images at the time when the own vehicle is traveling on a straight road, a curved road or a point of intersection.
Figure 8B:
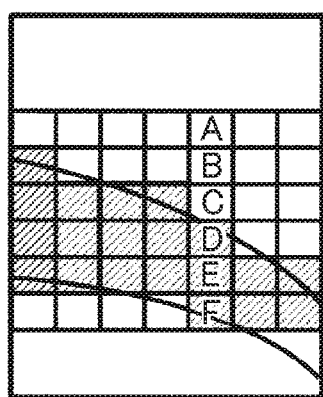
Figure 8C:
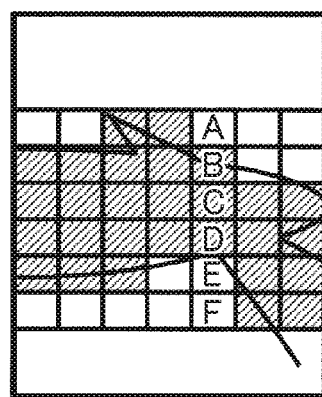
Figure 9:
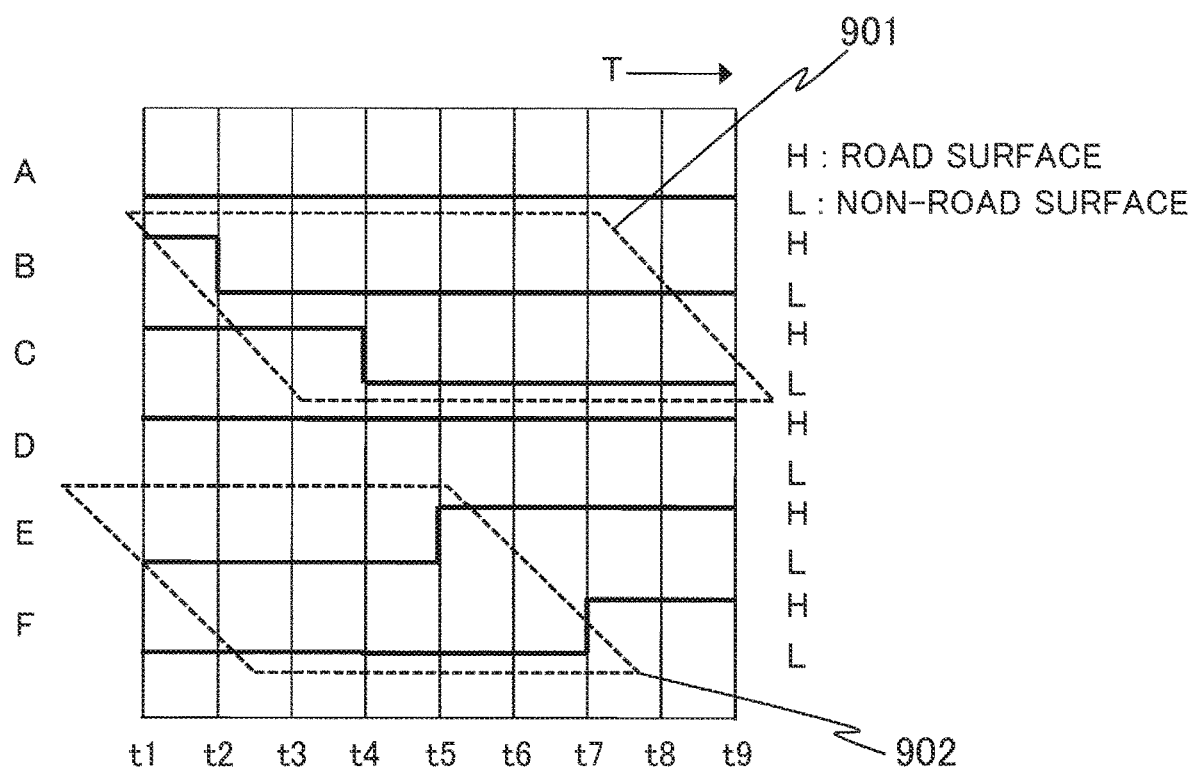
FIG. 9 is a chart which shows an example of change in the result of recognition of observation blocks at the time when the road shape has changed from straight to curved.
Figure 10:
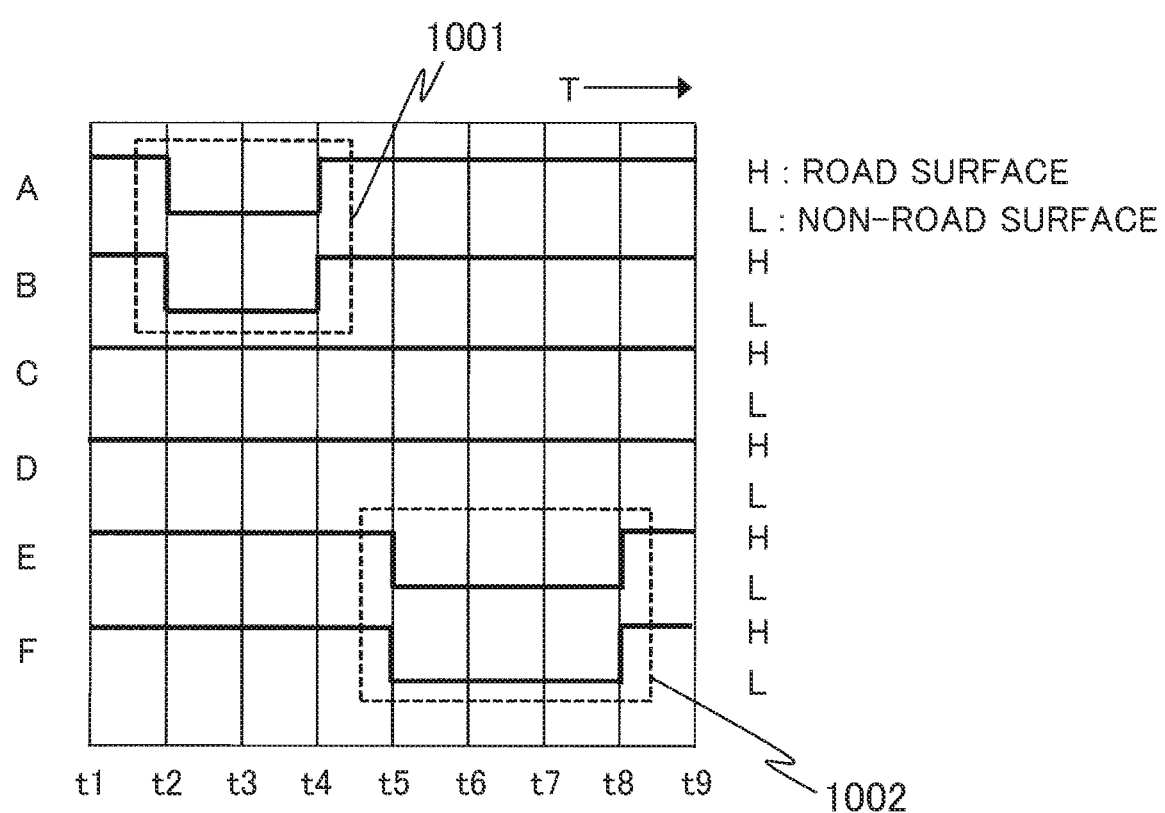
FIG. 10 is a chart which shows an example of change in the result of recognition of observation blocks at the time when the road shape has changed from straight to a point of intersection.

FIGS. 8 to 10 are views which explain an example of the time-series verification procedure in the case that the road shape has changed from straight to curved or a point of intersection. As mentioned earlier, the camera 20 is a fish-eye camera and has a feature that the resolution is low in regions near the upper and lower left and right ends of a shot image. Therefore, when a curve exists on an extension of the road, its road surface shows up in a left or right end region in the shot image where the resolution is low, so an error in road surface region detection is likely to occur. Also, when the own vehicle passes a point of intersection, the road surface of a road perpendicular to the road on which the own vehicle travels shows up in the shot image for a short time and in a lower or upper end region in the shot image where the resolution is low, so an error in road surface region detection is likely to occur. In order to solve these problems, the time-series verifying section 105 performs time-series verification as explained below to decide whether or not the road shape has changed from straight to curved or a point of intersection.

FIG. 8(a), FIG. 8(b), and FIG. 8(c) each show an example of a shot image taken by the camera 20. FIG. 8(a) is an example of a shot image when the own vehicle is traveling on a straight road; FIG. 8(b) is an example of a shot image when the own vehicle is traveling on a curved road; and FIG. 8(c) is an example of a shot image when the own vehicle is traveling at a point of intersection. Like FIGS. 7(a) to 7(c), for the convenience of explanation, these figures show only the right half of each shot image as a fish-eye image. Also, for easy understanding, an explanation will be given using the result of road surface detection for a shot image before the distortion correction process. Actually, however, time-series verification by the time-series verifying section 105 is performed on the result of road surface detection for an input image subjected to the distortion correction process by the image correcting section 101.

FIG. 9 is a chart which shows an example of change in the results of recognition of observation blocks at the time when the road shape has changed from straight to curved and accordingly the shot image has changed from FIG. 8(a) to FIG. 8(b). Here, among a plurality of observation blocks set on the input image, attention is paid to six observation blocks A, B, C, D, E, and F as shown in FIGS. 8(a) and 8(b). The chart shown in FIG. 9 indicates the results of recognition of the observation blocks A, B, C, D, E, and F in the order from top in the period from time t1 to t9, in which "H" represents a road surface block and "L" represents a non-road surface block.

When the input image changes from FIG. 8(a) to FIG. 8(b), in the chart in FIG. 9, first, as indicated by the portion with sign 901, the results of recognition of the observation blocks B and C adjacent to each other in the input image change from a road surface block to a non-road surface block sequentially in the period from time t2 to t4. Then, as indicated by the portion with sign 902, the results of recognition of the observation blocks E and F adjacent to each other under the observation blocks B and C in the input image change from a non-road surface block to a road surface block sequentially in the period from time t5 to t7, in a way opposite to the observation blocks B and C. When as mentioned above the results of road surface detection of observation blocks adjacent to each other at an upper position in the input image have changed from a road surface block to a non-road surface block sequentially and almost at the same time the results of road surface detection of observation blocks adjacent to each other at a lower position in the input image have changed from a non-road surface block to a road surface block sequentially, it can be decided that the road on which the own vehicle travels has changed from a straight road to a curved road surface.

Depending on the curving direction of the road, the change in the recognition result of each observation block may be opposite to the above. Specifically, when the results of road surface detection of observation blocks adjacent to each other at an upper position in the input image have changed from a non-road surface block to a road surface block sequentially and almost at the same time the results of road surface detection of observation blocks adjacent to each other at a lower position in the input image have changed from a road surface block to a non-road surface block sequentially, it can also be decided that the road on which the own vehicle travels has changed from a straight road to a curved road surface, in the same way as above.

The time-series verifying section 105 performs time-series verification to decide whether or not the road shape has changed from straight to curved, according to the procedure described above. Consequently, when in a given time period the results of road surface detection of observation blocks adjacent to each other at a first position in the input image have changed from a road surface block to a non-road surface block or from a non-road surface block to a road surface block sequentially and the results of road surface detection of observation blocks adjacent to each other at a second position under the first position have changed sequentially in a way opposite to the results of road surface detection of the observation blocks at the first position, it can be decided that the road shape has changed from straight to curved. For this reason, the road surface of a curved road which would usually tend to show up in a low-resolution part of the input image can be correctly detected as a road surface region.

FIG. 10 is a chart which shows an example of change in the results of recognition of observation blocks at the time when the road shape has changed from straight to a point of intersection and accordingly the shot image has changed from FIG. 8(a) to FIG. 8(c). Here, among a plurality of observation blocks set on the input image, attention is paid to the six observation blocks A, B, C, D, E, and F as shown in FIGS. 8(a) and 8(c). The chart shown in FIG. 10 indicates the results of recognition of the observation blocks A, B, C, D, E, and F in the order from top in the period from time t1 to t9, in which "H" represents a road surface block and "L" represents a non-road surface block.

When the input image changes from FIG. 8(a) to FIG. 8(c), in the chart in FIG. 10, first, as indicated by the portion with sign 1001, the results of recognition of the observation blocks A and B adjacent to each other in the input image change from a road surface block to a non-road surface block at the same time in the period from time t2 to t4 and then return to a road surface block again. Also, as indicated by the portion with sign 1002, the results of recognition of the observation blocks E and F adjacent to each other at a position under the observation blocks A and B in the input image change from a road surface block to a non-road surface block at the same time in the period from time t5 to t8 and then return to a road surface block again, like the observation blocks A and B. The observation blocks A and B located at the upper portion in the input image correspond to the road portion extending in the farther side direction of the point of intersection and the observation blocks E and F located at the lower portion in the input image correspond to the road portion extending in the nearer side direction of the point of intersection. When as mentioned above the results of road surface detection of a plurality of observation blocks adjacent to each other at each of the upper position and lower position in the input image have changed from a road surface block through a non-road surface block to a road surface block sequentially, it can be decided that the road on which the own vehicle travels is changing from a straight road to a point of intersection.

The time-series verifying section 105 performs time-series verification to decide whether or not the road shape has changed from straight to a point of intersection, according to the procedure described above. Consequently, when in a given time period the results of road surface detection of observation blocks adjacent to each other at a first position in the input image and the results of road surface detection of observation blocks adjacent to each other at a second position under the first position have changed from a road surface block through a non-road surface block to a road surface block sequentially, it can be decided that the road shape has changed from straight to a point of intersection. For this reason, the road surface of a cross road which would usually tend to show up in a low-resolution part of the input image can be correctly detected as a road surface region.

According to the first embodiment of the present invention described above, the following effects are brought about.

(1) The image processing device 10 includes a road surface detecting section 102, time-series verifying section 105, detection region selecting section 103, and detecting section 104. The road surface detecting section 102 detects a road surface region from an input image based on a shot image obtained by shooting with a camera 20. The time-series verifying section 105 performs time-series verification to verify the result of road surface detection in an input image in a time-series manner. The detection region selecting section 103 sets a detection region for detection of an object, namely a vehicle detection region to detect another vehicle, in the input image according to the result of road surface detection by the road surface detecting section 102 and the result of time-series verification by the time-series verifying section 105. The detecting section 104 detects another vehicle as an object in the set vehicle detection region. By doing so, another vehicle present around the own vehicle can be detected from the shot image accurately.

(2) The road surface detecting section 102 divides the input image into a plurality of observation blocks and decides whether each of the observation blocks is either a road surface block corresponding to a road surface region or a non-road surface block not corresponding to a road surface region. The time-series verifying section 105 performs time-series verification according to time-series change in the arrangement of road surface blocks and non-road surface blocks in the input image. Specifically, in time-series verification, when the positions of a plurality of non-road surface blocks adjacent to each other in the input image have moved in a time-series manner as shown in FIG. 7 and the difference between the moving speed of the non-road surface blocks and the moving speed of the background is not less than a specified value, the time-series verifying section 105 decides that the road surface region is hidden by an object. By doing so, when the road surface is hidden by an object, this can be decided reliably.

(3) Furthermore, in time-series verification, as shown in FIGS. 8 and 9, when in a given time period the results of decision by the road surface detecting section 102 as to observation blocks adjacent to each other at a first position in the input image have changed from a road surface block to a non-road surface block or from a non-road surface block to a road surface block sequentially and the results of decision by the road surface detecting section 102 as to observation blocks adjacent to each other at a second position under the first position in the input image have changed sequentially in a way opposite to the results of decision as to the observation blocks at the first position, the time-series verifying section 105 decides that the road shape corresponding to the road surface region has changed from straight to curved. By doing so, when the road shape has changed from straight to curved, this can be decided reliably.

(4) Furthermore, in time-series verification, as shown in FIGS. 8 and 10, when in a given time period the results of decision by the road surface detecting section 102 as to observation blocks adjacent to each other at a first position in the input image and the results of decision by the road surface detecting section 102 as to observation blocks adjacent to each other at a second position under the first position in the input image have changed from a road surface block through a non-road surface block to a road surface block sequentially, the time-series verifying section 105 decides that the road shape corresponding to the road surface region has changed from straight to a point of intersection. By doing so, when the road shape has changed from straight to a point of intersection, this can be decided reliably.

(5) The image processing device 10 further includes a road surface region interpolating section 106 which interpolates the road surface region according to the result of time-series verification by the time-series verifying section 105. The detection region selecting section 103 sets a vehicle detection region according to the result of road surface region detection by the road surface detecting section 102 and the result of interpolation of the road surface region by the road surface region interpolating section 106. By doing so, even if a road surface region is mistakenly decided as a non-road surface region, a vehicle detection region can be correctly set according to the actual road surface region.

(6) The image processing device 10 is mounted in the own vehicle and further includes a preferential direction selecting section 107 which sets a direction in which an object should be detected preferentially according to the traveling condition of the own vehicle. The detection region selecting section 103 sets a vehicle detection region according to the direction set by the preferential direction selecting section 107. By doing so, a vehicle detection region can be set appropriately according to the traveling condition of the own vehicle.

Second Embodiment

Figure 11:
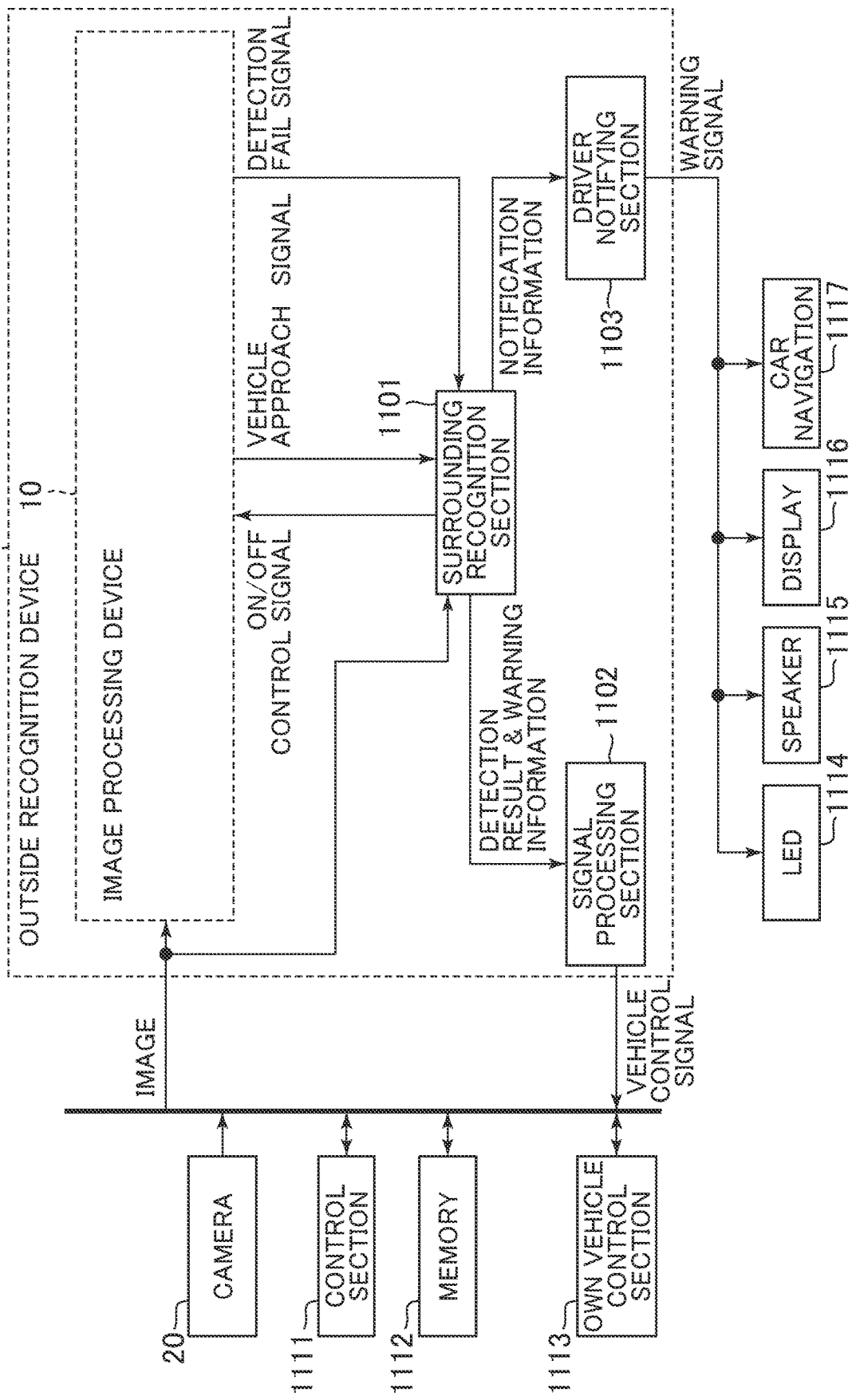
FIG. 11 is a diagram which shows an example of the outside recognition device according to the second embodiment of the present invention.

FIG. 11 is a diagram which shows an example of the outside recognition device according to the second embodiment of the present invention. As shown in FIG. 11, the outside recognition device 1100 according to this embodiment includes the image processing device 10 described in the first embodiment, a surrounding recognition section 1101, signal processing section 1102, and driver notifying section 1103. The outside recognition device 1100 is connected to a camera 20 mounted in the own vehicle like the image processing device 10 and also connected to a control section 1111, memory 1112, own vehicle control section 1113, LED 1114, speaker 1115, display 1116, and car navigation device 1117 which are mounted in the own vehicle. The image processing device 10 and other devices are connected to each other through a signal bus inside the own vehicle.

The camera 20 acquires a shot image of the surroundings of the own vehicle and sends it to the image processing device 10 in the outside recognition device 1100. The memory 1112 temporarily holds the shot image acquired by the camera 20. The control section 1111 controls input/output of the shot image between the camera 20 and the outside recognition device 1100 and input/output of a vehicle control signal between the outside recognition device 1100 and the own vehicle control section 1113.

The image processing device 10 detects another vehicle present around the own vehicle as described in the first embodiment and sends a vehicle approach signal based on the detection result to the surrounding recognition section 1101. Also, when it is difficult to detect another vehicle, a detection FAIL signal is sent to the surrounding recognition section 1101.

When a vehicle approach signal is sent from the image processing device 10, the surrounding recognition section 1101 performs a surrounding recognition process to recognize the surrounding environment around the own vehicle according to the signal. For example, using a shot image taken by the camera 20, it analyzes the surrounding space near and remote from the own vehicle to recognize whether or not there are other vehicles including a motorcycle and bicycle and a pedestrian and recognize whether or not there is an obstacle which hampers traveling or parking of the own vehicle. Also, when another vehicle or pedestrian is rapidly approaching the own vehicle, this is detected so that collision with the own vehicle or collision between the own vehicle and an obstacle is predicted. In addition, the surrounding recognition process may include a lane departure warning process to give a warning if the own vehicle departs from the lane during traveling, and a blind area warning process to give a warning when a human being or another vehicle comes in the blind area for the driver of the own vehicle. The surrounding recognition section 1101 sends the detection result based on the result of the surrounding recognition process and warning information to the signal processing section 1102 and also sends notification information for the driver of the own vehicle to the driver notifying section 1103 as necessary.

The signal processing section 1102 generates a vehicle control signal to control movement of the own vehicle according to the detection result and warning information sent from the surrounding recognition section 1101 and sends it to the own vehicle control section 1113. The own vehicle control section 1113 controls movement of the own vehicle according to the vehicle control signal received from the signal processing section 1102 to stop the own vehicle in order to avoid collision with another vehicle or a pedestrian or change the travel direction of the own vehicle in order to avoid collision with an obstacle.

The driver notifying section 1103 generates a warning signal to give a warning to the driver of the own vehicle according to the notification information sent from the surrounding recognition section 1101 and sends it to one of the LED 1114, speaker 1115, display 1116, and car navigation device 1117. Upon receipt of the warning signal from the driver notifying section 1103, according to the signal, each of the LED 1114, speaker 1115, display 1116, and car navigation device 1117 displays a warning or outputs a sound in a prescribed manner to warn the driver of the own vehicle of the other vehicle or pedestrian approaching the own vehicle or the existence of an obstacle.

When a detection FAIL signal is sent from the image processing device 10, it is considered that it is difficult for the image processing device 10 to detect another vehicle, so preferably the surrounding recognition section 1101 should stop operation of the image processing device 10 temporarily or continuously. The surrounding recognition section 1101 can start or stop operation of the image processing device 10 by sending an ON/OFF control signal to the image processing device 10. In addition, at this time, the surrounding recognition section 1101 can send notification information to the driver notifying section 1103 and cause the driver notifying section 1103 to generate a warning signal according to the information and send it to one of the LED 1114, speaker 1115, display 1116, and car navigation device 1117 to notify the driver of the own vehicle that operation of the image processing device 10 has stopped.

According to the second embodiment of the present invention described above, the outside recognition device 1100 includes the image processing device 10. Furthermore, the surrounding recognition section 1101, image processing section 1102, and driver notifying section 1103 send at least one of a warning signal to warn the driver of the own vehicle and a vehicle control signal to control movement of the own vehicle according to the result of other vehicle detection by the detecting section 104 in the image processing device 10. By doing so, the environment around the own vehicle can be recognized accurately.

In the embodiments described above, the object to be detected from a shot image is assumed to be another vehicle; however, the object is not limited thereto and instead, another type of physical body may be the object of detection. Furthermore, examples of detection of an object using a shot image taken by the camera 20 mounted in the vehicle have been explained; however, the camera to obtain a shot image is not limited to a camera mounted in the vehicle. For example, a shot image taken by any of cameras for various purposes other than an in-vehicle camera, such as a camera for street monitoring, may be used to detect an object.

The embodiments and various variations described so far are just examples and the present invention is not limited to what is described herein, unless the features of the invention are impaired. The present invention is not limited to the above embodiments and variations and various modifications may be made without departing from the gist of the present invention.

The disclosure of the following priority basic application is incorporated herein by reference.

Japanese Patent Application No. 2016-151351 (filed on Aug. 1, 2016)

LIST OF REFERENCE SIGNS

10 . . . image processing device
20 . . . camera
101 . . . image correcting section
102 . . . road surface detecting section
103 . . . detection region selecting section
104 . . . detecting section
105 . . . time-series verifying section
106 . . . road surface region interpolating section
107 . . . preferential direction selecting section
1100 . . . outside recognition device
1101 . . . surrounding recognition section
1102 . . . signal processing section
1103 . . . driver notifying section

The invention claimed is:

1. An image processing device comprising:
a road surface detecting section to detect a road surface region from an input image based on a shot image obtained by shooting with a camera;
a time-series verifying section to perform time-series verification to verify a result of detection of the road surface region in the input image in a time-series manner;
a detection region selecting section to set a detection region for detection of an object in the input image according to the result of detection of the road surface region by the road surface detecting section and a result of the time-series verification by the time-series verifying section; and
a detecting section to detect the object in the detection region,
wherein
the road surface detecting section divides the input image into a plurality of observation blocks and decides whether each of the observation blocks is either a road surface block corresponding to the road surface region or a non-road surface block not corresponding to the road surface region, and
in the time-series verification, when positions of the non-road surface blocks adjacent to each other in the input image have moved in a time-series manner and a difference between moving speed of the non-road surface blocks and moving speed of a background is not less than a specified value, the time-series verifying section decides that the road surface region is hidden by the object.

2. The image processing device according to claim 1, further comprising a road surface region interpolating section to interpolate the road surface region according to a result of the time-series verification by the time-series verifying section,
wherein the detection region selecting section sets the detection region according to the result of detection of the road surface region by the road surface detecting section and a result of interpolation of the road surface region by the road surface region interpolating section.

3. The image processing device according to claim 1,
wherein the image processing device is mounted in an own vehicle, and
the object is another vehicle present around the own vehicle.

4. The image processing device according to claim 3, further comprising a preferential direction selecting section to set a direction in which the object should be detected preferentially according to a traveling condition of the own vehicle,
wherein the detection region selecting section sets the detection region according to the direction set by the preferential direction selecting section.

5. An outside recognition device comprising the image processing device according to claim 3,
wherein at least one of a warning signal to warn a driver of the own vehicle and a vehicle control signal to control movement of the own vehicle is sent according to a result of detection of the other vehicle by the detecting section.

6. An image processing device, comprising:
a road surface detecting section to detect a road surface region from an input image based on a shot image obtained by shooting with a camera;
a time-series verifying section to perform time-series verification to verify a result of detection of the road surface region in the input image in a time-series manner;
a detection region selecting section to set a detection region for detection of an object in the input image according to the result of detection of the road surface region by the road surface detecting section and a result of the time-series verification by the time-series verifying section; and a detecting section to detect the object in the detection region, wherein the road surface detecting section divides the input image into a plurality of observation blocks and decides whether each of the observation blocks is either a road surface block corresponding to the road surface region or a non-road surface block not corresponding to the road surface region, and in the time-series verification, when, in a given time period, results of decision by the road surface detecting section as to the observation blocks adjacent to each other at a first position in the input image have changed from the road surface block to the non-road surface block or from the non-road surface block to the road surface block sequentially and results of decision by the road surface detecting section as to the observation blocks adjacent to each other at a second position under the first position in the input image have changed sequentially in a way opposite to the results of decision as to the observation blocks at the first position, the time-series verifying section decides that a road shape corresponding to the road surface region has changed from straight to curved.

7. The image processing device according to claim 6, further comprising a road surface region interpolating section to interpolate the road surface region according to a result of the time-series verification by the time-series verifying section, wherein the detection region selecting section sets the detection region according to the result of detection of the road surface region by the road surface detecting section and a result of interpolation of the road surface region by the road surface region interpolating section.

8. The image processing device according to claim 6, wherein the image processing device is mounted in an own vehicle, and the object is another vehicle present around the own vehicle.

9. An image processing device, comprising:

a road surface detecting section to detect a road surface region from an input image based on a shot image obtained by shooting with a camera;

a time-series verifying section to perform time-series verification to verify a result of detection of the road surface region in the input image in a time-series manner;

a detection region selecting section to set a detection region for detection of an object in the input image according to the result of detection of the road surface region by the road surface detecting section and a result of the time-series verification by the time-series verifying section; and a detecting section to detect the object in the detection region, wherein the road surface detecting section divides the input image into a plurality of observation blocks and decides whether each of the observation blocks is either a road surface block corresponding to the road surface region or a non-road surface block not corresponding to the road surface region, and in the time-series verification, when, in a given time period, results of decision by the road surface detecting section as to the observation blocks adjacent to each other at a first position in the input image and results of decision by the road surface detecting section as to the observation blocks adjacent to each other at a second position under the first position in the input image have changed from the road surface block through the non-road surface block to the road surface block sequentially, the time-series verifying section decides that a road shape corresponding to the road surface region has changed from straight to a point of intersection.

10. The image processing device according to claim 9, further comprising a road surface region interpolating section to interpolate the road surface region according to a result of the time-series verification by the time-series verifying section, wherein the detection region selecting section sets the detection region according to the result of detection of the road surface region by the road surface detecting section and a result of interpolation of the road surface region by the road surface region interpolating section.

11. The image processing device according to claim 9, wherein the image processing device is mounted in an own vehicle, and the object is another vehicle present around the own vehicle.

\* \* \* \* \*